UNITED STATES PATENT OFFICE 2,366,313

POLYMERIZATION OF BUTADIENE-1,3

George L. Browning, Jr., Akron, Ohio, assignor to The B. F. Goodrich Company, New York, N. Y., a corporation of New York No Drawing. Application November 26, 1940, Serial No. 367,267

8 Claims. (Cl. 260—84.5)

This invention relates to the polymerization of butadienes-1,3, and particularly to a method whereby butadienes-1,3 may be polymerized in an aqueous emulsion to form products closely resembling natural crude rubber.

The emulsion polymerization of butadienes-1,3 either alone or in admixture with other butadienes-1,3 or with other unsaturated compounds copolymerizable therewith known as comonomers to form compositions of matter more or less resembling rubber is well known. It has been commonly observed, however, that the products of such polymerization often resemble vulcanized rubber rather than natural crude rubber in respect to solubility, plasticity, and processing characteristics. Thus it has often been found that the polymers were insoluble in and, in some cases, not even swelled by benzene or acetone, and that they were tough, non-plastic materials which either would not homogenize on a mill or which were very difficult to mill and to subject to other ordinary processing operations for natural rubber.

I have now discovered a class of materials which modifies the emulsion polymerization of butadienes-1,3 in such a manner that polymers more nearly resembling natural crude rubber may be produced than when the polymerization is carried on in the absence of the materials of this invention. This class of materials, which I have termed "modifiers" consists of the dialkyl polysulfides in which each alkyl group is unsymmetrical. For some reason which is not fully understood, symmetrical dialkyl polysulfides such as diethyl disulfide, diisopropyl disulfide, and di-ter.butyl disulfide possess very little activity as modifiers, while unsymmetrical dialkyl polysulfides such as di-sec.butyl disulfide, di-2-methyl-butyl disulfide, di-3-methylpentyl disulfide, di-2-ethylhexyl disulfide, and the higher polysulfides such as the corresponding tri- and tetrasulfides exhibit very pronounced modifying activity.

To illustrate the advantages attending the use of one of the modifiers of this invention, a charge containing 7.5 gm. of butadiene, 2.5 gm. of acrylonitrile, 0.035 gm. of hydrogen peroxide, and 25 cc. of a 2% solution of myristic acid which had been 85% neutralized with sodium hydroxide was polymerized with agitation in a glass vessel at 30° C. Another charge containing .04 gm. of di-2-ethylhexyl disulfide in addition to the above ingredients was polymerized in a similar manner. The unmodified polymer was obtained in the form of non-plastic, non-coherent crumbs, while the modified polymer was obtained as a coherent, plastic, mass. The inclusion of the modifier in the charge increased the solubility of the polymer in benzene from 3 to 15%, increased the tensile strength of the vulcanized polymer from 4200 to 5000 lbs./in.$^2$, and increased the elongation of the vulcanized polymer from 450 to 560%. Further experiments showed that higher proportions of modifier increased the solubility and plasticity of the product even more markedly. The use of .08 gm. of di-2-ethylhexyl disulfide in the above recipe increased the solubility of the polymer to 44%, while the use of 0.2 gm. resulted in the formation of a polymer which was 87% soluble in benzene. Similar results may be obtained with di-sec.butyl disulfide, di-2-methylbutyl disulfide, and other modifiers within the scope of this invention.

While the above examples are confined to the use of disulfides as the modifiers, it will be clear to those skilled in the art that other unsymmetrical dialkyl polysulfides such as the tri- and tetrasulfides may similarly be employed. The proportion in which the modifier is included in the composition depends somewhat upon the properties desired in the copolymer, the higher proportions of modifier in general producing softer, more soluble polymers. Very small amounts of modifier such as 0.1% based on the monomer or even less may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of the polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber by sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion of an unsymmetrical dialkyl polysulfide in emulsion polymerization batches produces the beneficial results hereinbefore described.

The modifying agents of this invention may be employed in emulsion polymerizations of butadienes-1,3, by which is meant butadiene-1,3 and its homologs and analogs such as 2,3-dimethylbutadiene-1,3, isoprene, 2-chlorobutadiene, and piperylene, either alone or in admixture with each other or with other unsaturated compounds copolymerizable therewith known as comonomers such as styrene, vinyl naphthalene, acrylonitrile, methyl methacrylate, vinyl acetate, vinylidene chloride, methyl vinyl ketone, methyl vinyl ether, and other polymerizable hydrocarbons, nitriles, esters, ketones, and ethers. These comonomers are preferably, though not necessarily, employed in minor proportions.

The polymerization of the above materials in aqueous emulsion may be effected by various catalysts such as per-compounds including hydrogen peroxide, ammonium persulfate, potassium persulfate, and other peroxides, persulfates, perborates, percarbonates, and the like, diazoaminobenzene, and dipotassium diazomethane disulfonate. When it is desired to decrease the time required to form the polymer, it may be desirable to include an activator for the catalyst in the emulsion. When hydrogen peroxide is being employed as the catalyst, for instance, compounds which may form complexes with the hydrogen peroxide such as sodium pyrophosphate, sodium oxalate, potassium fluoride, urea, glycine, alanine, and the like may be employed to activate the catalyst and produce a desirable type of polymer in a shorter period of time.

Any of the ordinary emulsifying agents such as fatty acid soaps, hymolal sulfates or sulfonates, alkylated aromatic salts of high molecular weight, organic bases, etc., may be employed to effect the emulsion of the monomers in the water. The polymers may be formed more rapidly by employing emulsifying agents which are at the same time polymerization catalysts, such as fatty acid soaps, and by using somewhat higher proportions than are necessary to form good emulsions.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing an aqueous emulsion of a butadiene-1,3 in the presence of a dialkyl polysulfide in which each alkyl group is unsymmetrical.

2. The method which comprises polymerizing an aqueous emulsion of a butadiene-1,3 in the presence of a dialkyl disulfide in which each alkyl group is unsymmetrical.

3. The method which comprises polymerizing an aqueous emulsion of a butadiene-1,3 in the presence of a di-2-ethylhexyl polysulfide.

4. The method which comprises polymerizing an aqueous emulsion comprising butadiene-1,3 in the presence of di-2-ethylhexyl disulfide.

5. The method which comprises polymerizing an aqueous emulsion of a mixture of butadiene-1,3 and a minor proportion of a compound copolymerizable therewith in aqueous emulsion, in the presence of a dialkyl polysulfide in which each alkyl group is unsymmetrical.

6. The method which comprises polymerizing an aqueous emulsion of a mixture of butadiene-1,3 and a minor proportion of acrylonitrile in the presence of a dialkyl polysulfide in which each alkyl group is unsymmetrical.

7. The method which comprises polymerizing an aqueous emulsion of a mixture of butadiene-1,3 and a minor proportion of acrylonitrile in the presence of di-2-ethylhexyl disulfide.

8. The method which comprises polymerizing in aqueous emulsion a mixture of butadiene-1,3 and a minor proportion of styrene in the presence of a dialkyl polysulfide in which each alkyl group is unsymmetrical.

GEORGE L. BROWNING, Jr.